US008853613B1

(12) United States Patent
Compton et al.

(10) Patent No.: US 8,853,613 B1
(45) Date of Patent: Oct. 7, 2014

(54) MAGNETIC FIELD COILS FOR MAGNETO-OPTICAL TRAP

(71) Applicant: Honeywell International Inc., Morristown, NJ (US)

(72) Inventors: Robert Compton, Plymouth, MN (US); Chad Fertig, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 14/035,755

(22) Filed: Sep. 24, 2013

(51) Int. Cl.

| | |
|---|---|
| ***H05H 3/00*** | (2006.01) |
| ***H05H 3/02*** | (2006.01) |
| ***H01J 49/00*** | (2006.01) |
| ***G02B 27/00*** | (2006.01) |
| ***H01F 7/20*** | (2006.01) |
| ***G21K 1/00*** | (2006.01) |

(52) U.S. Cl.
CPC . *G21K 1/006* (2013.01); *H01F 7/20* (2013.01)
USPC ......... 250/251; 250/252.1; 250/253; 250/526

(58) Field of Classification Search
USPC .............................. 250/251, 252.1, 253, 526
See application file for complete search history.

(56) References Cited

U.S. PATENT DOCUMENTS

| | | | | |
|---|---|---|---|---|
| 6,476,383 | B1 | 11/2002 | Esslinger et al. | |
| 6,495,822 | B2 | 12/2002 | Hirano et al. | |
| 7,459,673 | B2 * | 12/2008 | Katori | 250/251 |
| 7,709,807 | B2 * | 5/2010 | McClelland et al. | 250/423 P |
| 7,816,643 | B2 | 10/2010 | Hyodo | |
| 8,080,778 | B2 * | 12/2011 | McBride | 250/251 |
| 8,299,419 | B2 * | 10/2012 | Vestergaard Hau | 250/251 |
| 2007/0158541 | A1 * | 7/2007 | Katori | 250/281 |
| 2008/0073494 | A1 * | 3/2008 | Hyodo | 250/251 |
| 2008/0296483 | A1 * | 12/2008 | McClelland et al. | 250/251 |
| 2009/0212204 | A1 * | 8/2009 | McBride | 250/251 |
| 2010/0012827 | A1 * | 1/2010 | Vestergaard Hau | 250/251 |
| 2011/0290991 | A1 | 12/2011 | Booth et al. | |
| 2013/0048846 | A1 * | 2/2013 | Du et al. | 250/251 |
| 2013/0152680 | A1 * | 6/2013 | Sackett et al. | 73/488 |

OTHER PUBLICATIONS

Compton et al., "Folded Optics for Batch Fabricated Atomic Sensor", "U.S. Appl. No. 13/663,057, filed Oct. 29, 2012".

* cited by examiner

*Primary Examiner* — Bernard E Souw
(74) *Attorney, Agent, or Firm* — Fogg & Powers LLC

(57) ABSTRACT

A magnetic field coil arrangement for a magneto-optical trap comprises a first transparent substrate having a first surface, a second transparent substrate having a second surface opposite from the first surface, one or more side walls coupled between the first and second transparent substrates, a first set of magnetic field coils on the first surface of the first transparent substrate, and a second set of magnetic field coils on the second surface of the second transparent substrate. The second set of magnetic field coils in an offset alignment with the first set of magnetic field coils. The first and second sets of magnetic field coils are configured to produce a magnetic field distribution that mimics a quadrupole magnetic field distribution in a central location between the first and second transparent substrates.

20 Claims, 14 Drawing Sheets

MAGNETIC FIELD COILS FOR MAGNETO-OPTICAL TRAP

BACKGROUND

A magneto-optical trap (MOT) is used to cool and trap a dilute atomic gas to temperatures of about 100 μK. The MOT includes a set of lasers that cool the atoms through resonant absorption of light, and a quadrupole magnetic field that traps atoms through an attractive force on each atom's dipole magnetic moment. The MOT works optimally when resonant laser light is directed at the gas sample along all six Cartesian axes. One of these axes is optimally chosen to be the principle axis of the quadrupole magnetic field. The traditional approach to accommodate this geometry is to trap atoms in a vacuum chamber with windows that are arranged as the faces of a cube. Laser light is directed along all six Cartesian axes, perpendicular to each window, into the chamber that contains the atomic gas. A pair of magnetic coils is typically located on opposing sides of the chamber and produces the quadrupole magnetic field.

SUMMARY

A magnetic field coil arrangement for a magneto-optical trap comprises a first transparent substrate having a first surface, a second transparent substrate having a second surface opposite from the first surface, one or more side walls coupled between the first and second transparent substrates, a first set of magnetic field coils on the first surface of the first transparent substrate, and a second set of magnetic field coils on the second surface of the second transparent substrate. The second set of magnetic field coils in an offset alignment with the first set of magnetic field coils. The first and second sets of magnetic field coils are configured to produce a magnetic field distribution that mimics a quadrupole magnetic field distribution in a central location between the first and second transparent substrates.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A magnetic field coil arrangement is provided for a magneto-optical trap (MOT) such as a planar cold atom MOT that can be used in an atomic sensor. The magnetic field coil arrangement generally includes a first set of magnetic field coils on a first surface of the MOT, and a second set of magnetic field coils on an opposing second surface of the MOT. In one implementation, the first set of magnetic field coils includes three coils in a substantially planar arrangement on the first surface, and the second set of magnetic field coils includes three coils in a substantially planar arrangement on the opposing second surface.

When the first and second sets of magnetic field coils are electrically connected to one or more power sources, the magnetic field coils have an off axis magnetic field orientation that mimics a quadrupole magnetic field distribution in a central location of the MOT, where principal field axes are aligned with incoming laser beam paths. The present magnetic field coils can replace or supplement traditional MOT coils, and enable a planar, compact sensor package to be produced.

Further details of the present magnetic field coil arrangement are described hereafter with respect to the drawings.

Figure 1:
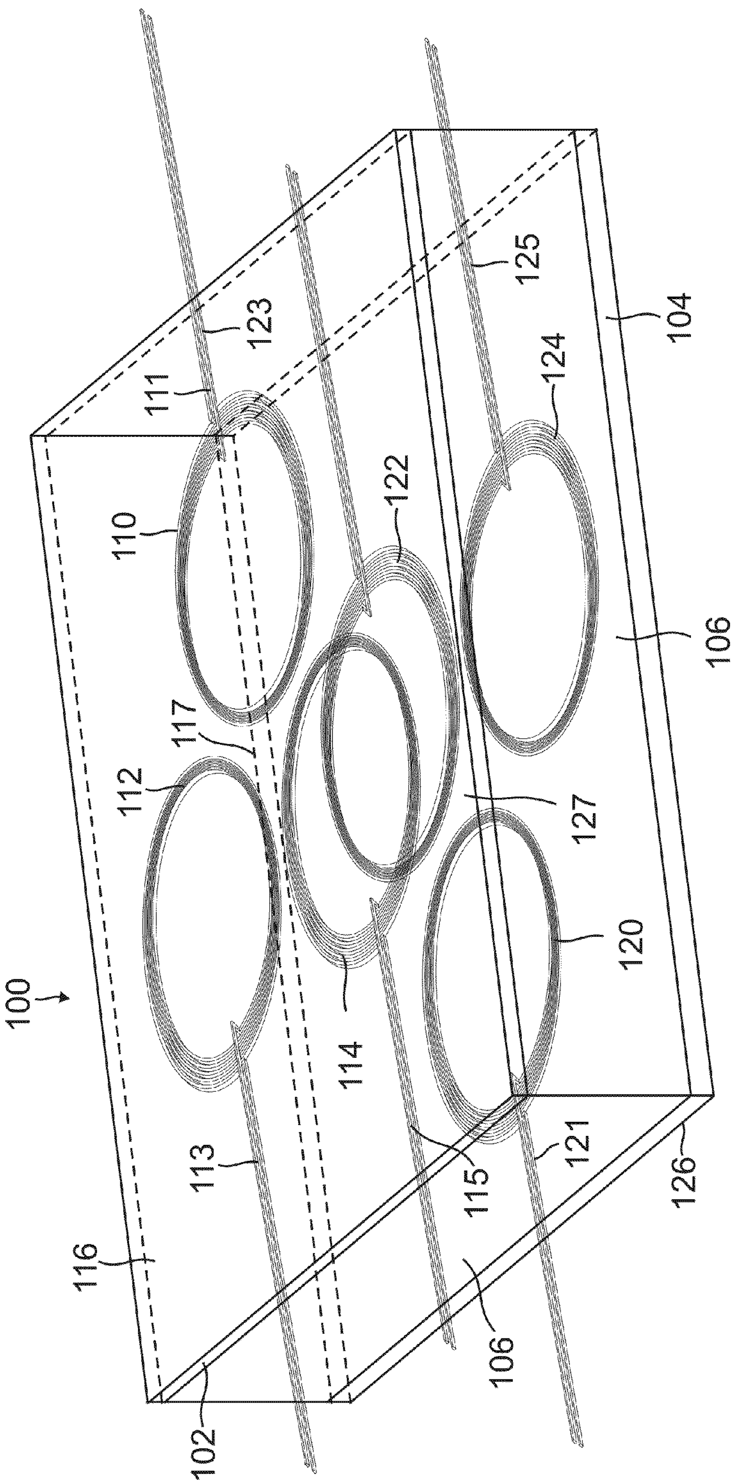
FIG. 1 is a schematic perspective view of a magnetic field coil arrangement for a magneto-optical trap (MOT) device according to one embodiment.
Figure 2:
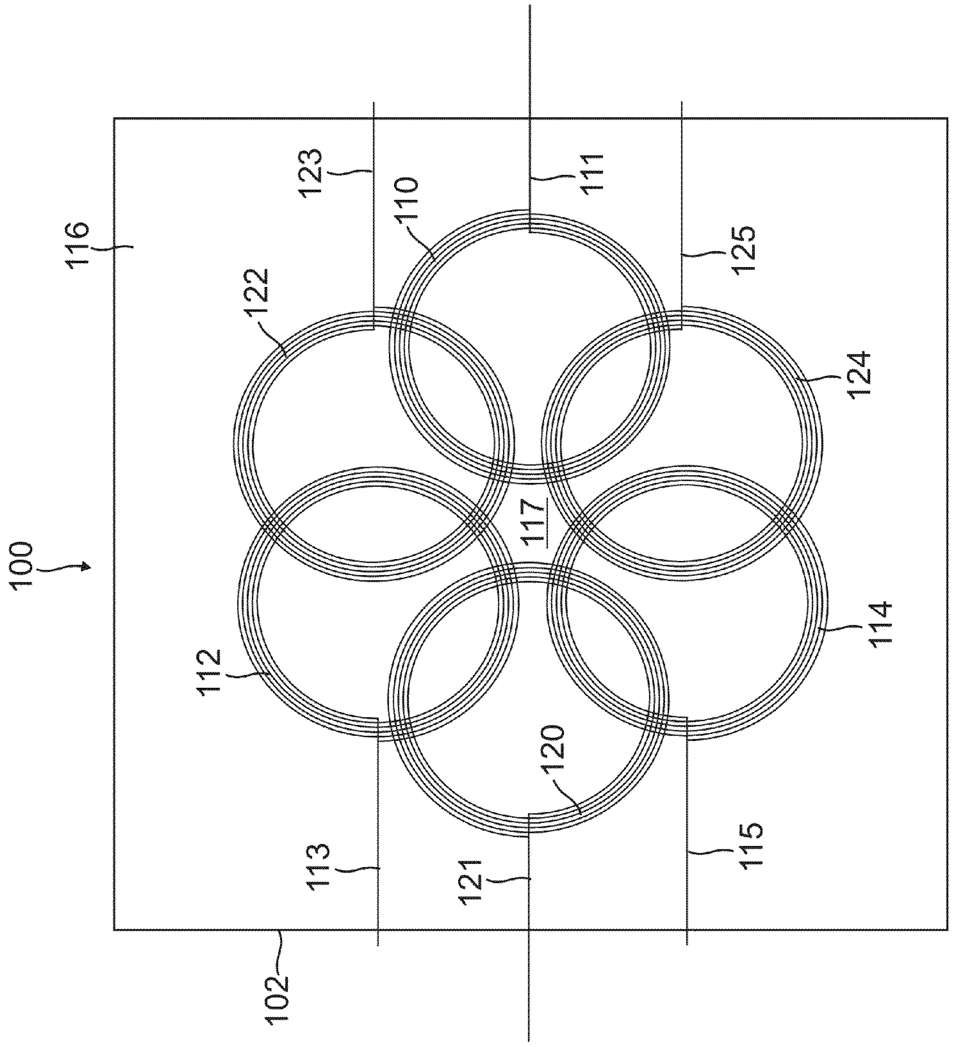
FIG. 2 is a top view of the magnetic field coil arrangement of FIG. 1.

FIGS. 1 and 2 schematically illustrate a magnetic field coil arrangement 100 for a MOT according to one embodiment. In general, the magnetic field coil arrangement 100 includes two sets of magnetic field coils, with a first set of magnetic field coils on a first transparent substrate 102, and a second set of magnetic field coils on an opposing second transparent substrate 104. As shown in FIG. 1, the transparent substrate 104 is spaced apart from and in vertical alignment with the transparent substrate 102. In one embodiment, transparent substrates 102 and 104 are joined to a plurality of supporting side walls 106 on opposite ends thereof to provide an airtight enclosure.

The transparent substrates 102, 104 can be composed of glass materials, for example, such as planar glass panels. The side walls 106 can be composed of silicon, glass, or other rigid material. In one implementation, where side walls 106 are fabricated from silicon and transparent substrates 102, 104 are glass panels, the glass panels can be anodically bonded to opposite ends of side walls 102.

The first set of magnetic field coils includes a first coil 110, a second coil 112, and third coil 114, which are located on a first surface 116 of first transparent substrate 102. The coils 110, 112, 114 have a substantially planar configuration and are spaced apart from each other around a central location 117 on first surface 116. The second set of magnetic field coils includes a fourth coil 120, a fifth coil 122, and a sixth coil 124, which are located on a second surface 126 of second transparent substrate 104 opposite from first surface 116 of transparent substrate 102. The coils 120, 122, 124 have a substantially planar configuration and are spaced apart from each other around a central location 127 on second surface 126.

As illustrated in FIG. 2, coils 110, 112, and 114 are in an offset alignment with coils 120, 122, and 124, such that each coil on first surface 116 is located partially over the area covered by two coils on second surface 126. For example, coil 110 is partially over the area covered by coils 122 and 124; coil 112 is partially over the area covered by coils 120 and 122; and coil 114 is partially over the area covered by coils 120 and 124. This arrangement of the magnetic field coils allows for a magnetic field distribution that mimics a quadrupole magnetic field distribution to be produced in a central location between transparent substrate 102 and transparent substrate 104 when the magnetic field coils are electrically connected to one or more power sources.

As depicted in FIGS. 1 and 2, each of coils 110, 112, 114 have a corresponding pair of connection lines 111, 113, 115, which extend along and beyond first surface 116 to connect with one or more power sources. Likewise, each of coils 120, 122, 124 have a corresponding pair of connection lines 121, 123, 125, which extend along and beyond second surface 126 to connect with the one or more power sources. In an exemplary implementation, one line in each pair of connection lines is connected to a positive electrical source, and the other line in the pair is connected to a negative electrical source. The power source can be a pulsed current source that is kept at a substantially constant level.

Although the magnetic field coil arrangement of FIGS. 1 and 2 includes six coils, it should be understood that more or less coils may be employed as needed for a given implementation. In addition, the coils may have a circular shape, an elliptical shape, or the like.

The magnetic field coils can be planar fabricated using traditional, low cost cleanroom techniques. For example, a conductive material that forms the magnetic field coils can be deposited on a transparent substrate such as glass, Pyrex, or the like, using conventional cleanroom deposition techniques. Examples of such deposition techniques include optical or e-beam lithography, sputtering, or e-beam evaporation. The conductive material can be various metals such as, copper, gold, aluminum, as well as optically transparent conductive materials such as indium tin oxide. The conductive material can be deposited in multiple layers as needed in order to produce a desirable number of turns for each coil. In an alternative method, the coils can be fabricated separately, such as by deposition on a silicon substrate, and then attached to a transparent substrate through conventional bonding techniques.

Figure 3A:
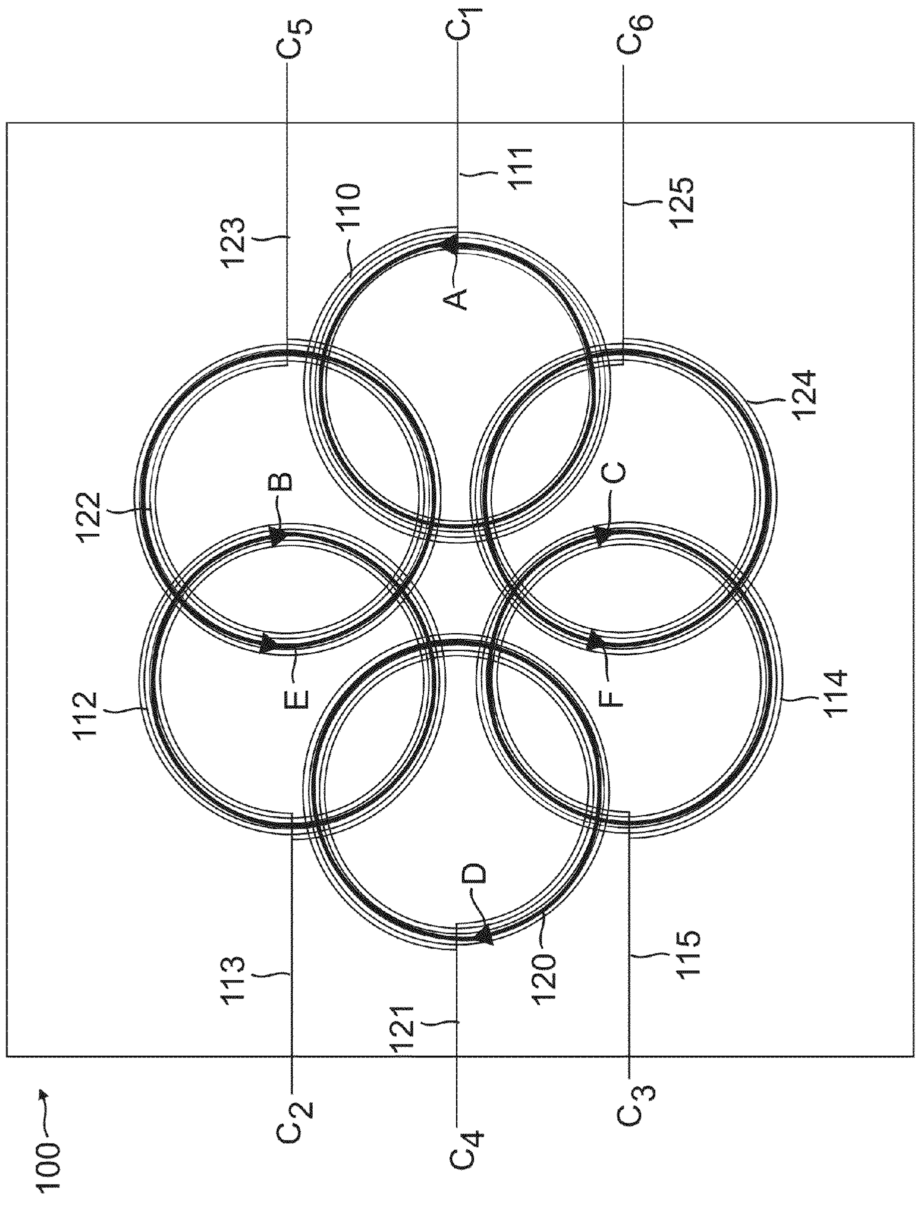
FIG. 3A is a top view of the magnetic field coil arrangement of FIG. 1, which additionally shows a direction of current flow for each of the coils according to one implementation.

FIG. 3A depicts a direction of the current flow for each of the coils in magnetic field coil arrangement 100 when viewed from the top according to one implementation. The connection lines 111 of coil 110 are connected to a first current source (C1) such that the current flows in a counter clockwise direction around coil 110 as indicated by the circular arrow A. The connection lines 113 of coil 112 are connected to a second current source (C2) such that the current flows in a clockwise direction around coil 112 as indicated by the circular arrow B. The connection lines 115 of coil 114 are connected to a third current source (C3) such that the current flows in a clockwise direction around coil 114 as indicated by the circular arrow C. The connection lines 121 of coil 120 are connected to a fourth current source (C4) such that the current flows in a clockwise direction around coil 110 as indicated by the circular arrow D. The connection lines 123 of coil 122 are connected to a fifth current source (C5) such that the current flows in a counter clockwise direction around coil 122 as indicated by the circular arrow E. The connection lines 125 of coil 124 are connected to a sixth current source (C6) such that the current flows in a counter clockwise direction around coil 124 as indicated by the circular arrow F.

Figure 3B:
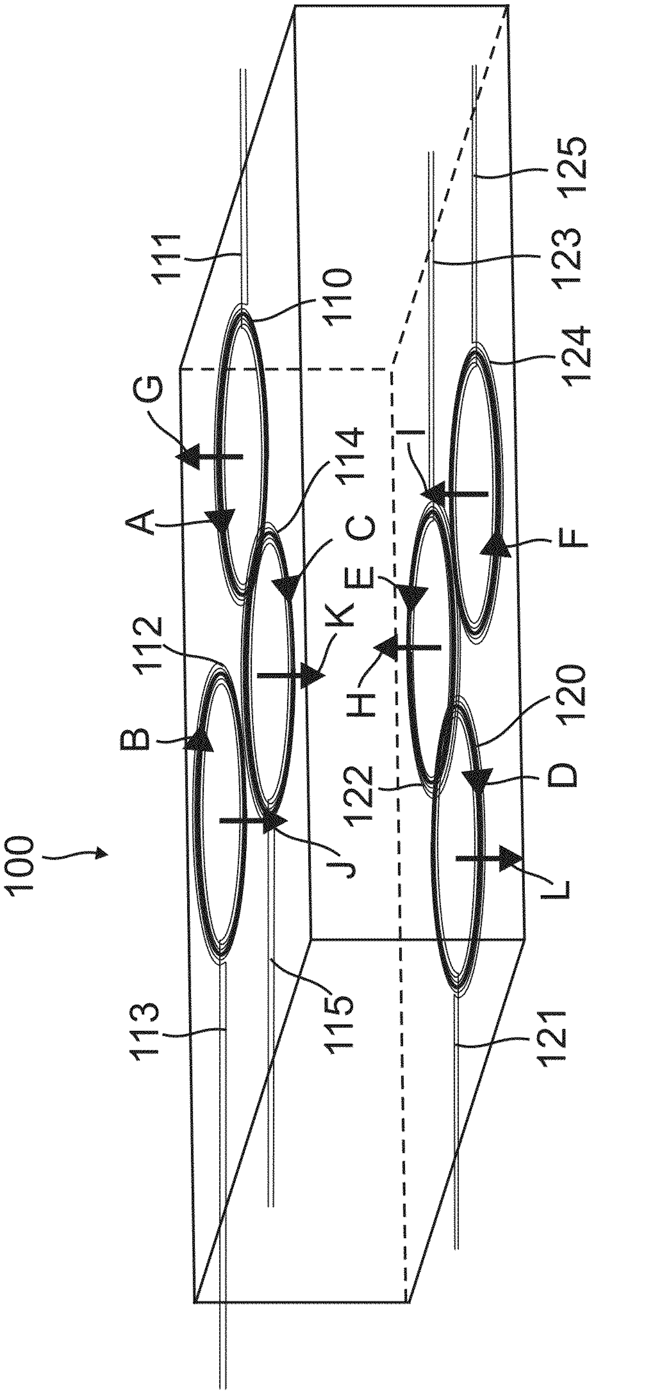
FIG. 3B is a perspective view of the magnetic field coil arrangement of FIG. 3A, which additionally shows the resulting magnetic field orientation for each of the coils.

FIG. 3B is a perspective view of the magnetic field coil arrangement 100 of FIG. 3A, which additionally shows the resulting magnetic field orientation for each of the coils with the respective current flows. The coils 110, 122, and 124 have magnetic fields oriented toward the top of magnetic field coil arrangement 100 as indicated respectively by arrows G, H, and I. The coils 112, 114, and 120 have magnetic fields oriented toward the bottom of magnetic field coil arrangement 100 as indicated respectively by arrows J, K, and L.

The current flow configuration shown in FIGS. 3A and 3B for magnetic field coil arrangement 100 provides a good approximation of a quadrupole field near a central location of a MOT, providing for optimal cooling and trapping of the atoms in the MOT.

Figure 4A:
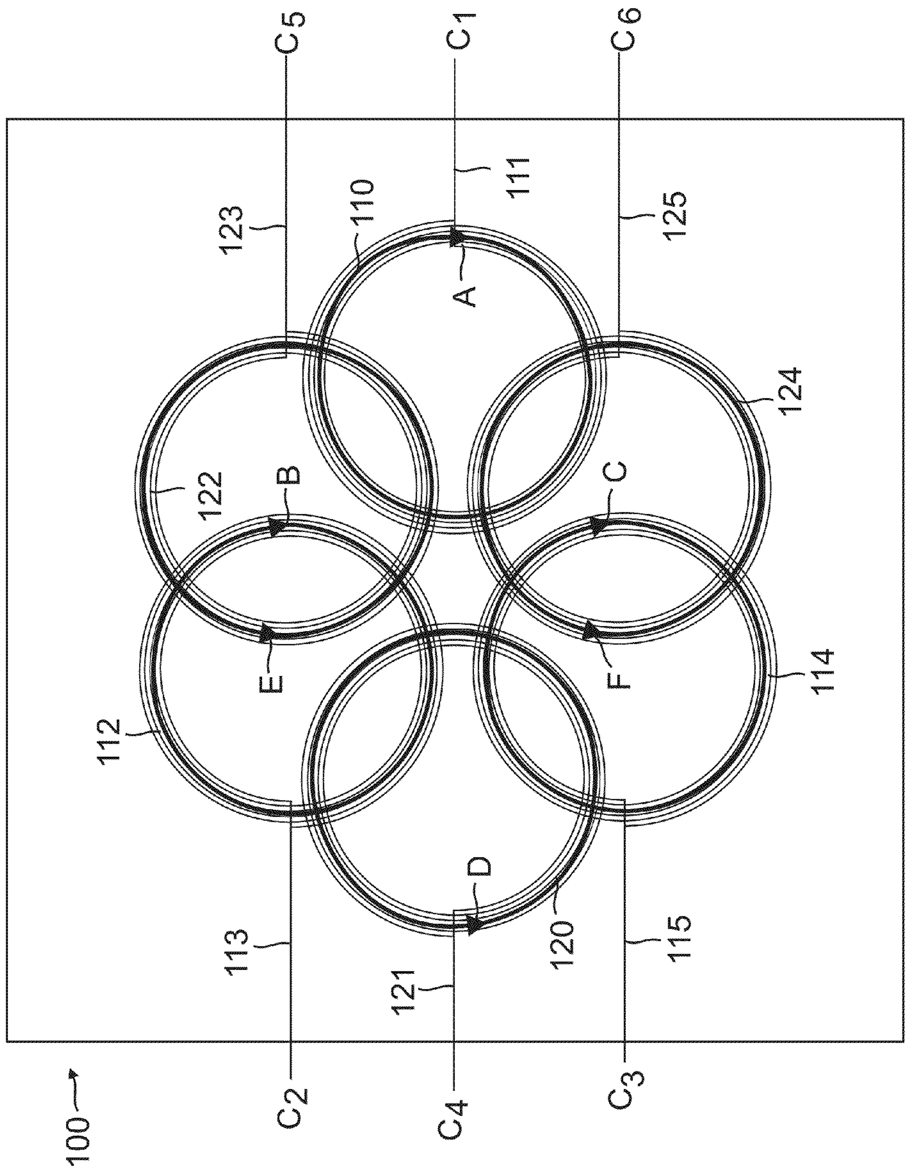
FIG. 4A is a top view of the magnetic field coil arrangement of FIG. 1, which additionally shows a direction of current flow for each of the coils according to another implementation.

FIG. 4A depicts a direction of the current flow for each of the coils in magnetic field coil arrangement 100 when viewed from the top according to another implementation. The connection lines 111 of coil 110 are connected to a first current source (C1) such that the current flows in a counter clockwise direction around coil 110 as indicated by the circular arrow A. The connection lines 113 of coil 112 are connected to a second current source (C2) such that the current flows in a clockwise direction around coil 112 as indicated by the circular arrow B. The connection lines 115 of coil 114 are connected to a third current source (C3) such that the current flows in a clockwise direction around coil 114 as indicated by the circular arrow C. The connection lines 121 of coil 120 are connected to a fourth current source (C4) such that the current flows in a counter clockwise direction around coil 120 as indicated by the circular arrow D. The connection lines 123 of coil 122 are connected to a fifth current source (C5) such that the current flows in a counter clockwise direction around coil 122 as indicated by the circular arrow E. The connection lines 125 of coil 124 are connected to a sixth current source (C6) such that the current flows in a counter clockwise direction around coil 124 as indicated by the circular arrow F.

Figure 4B:
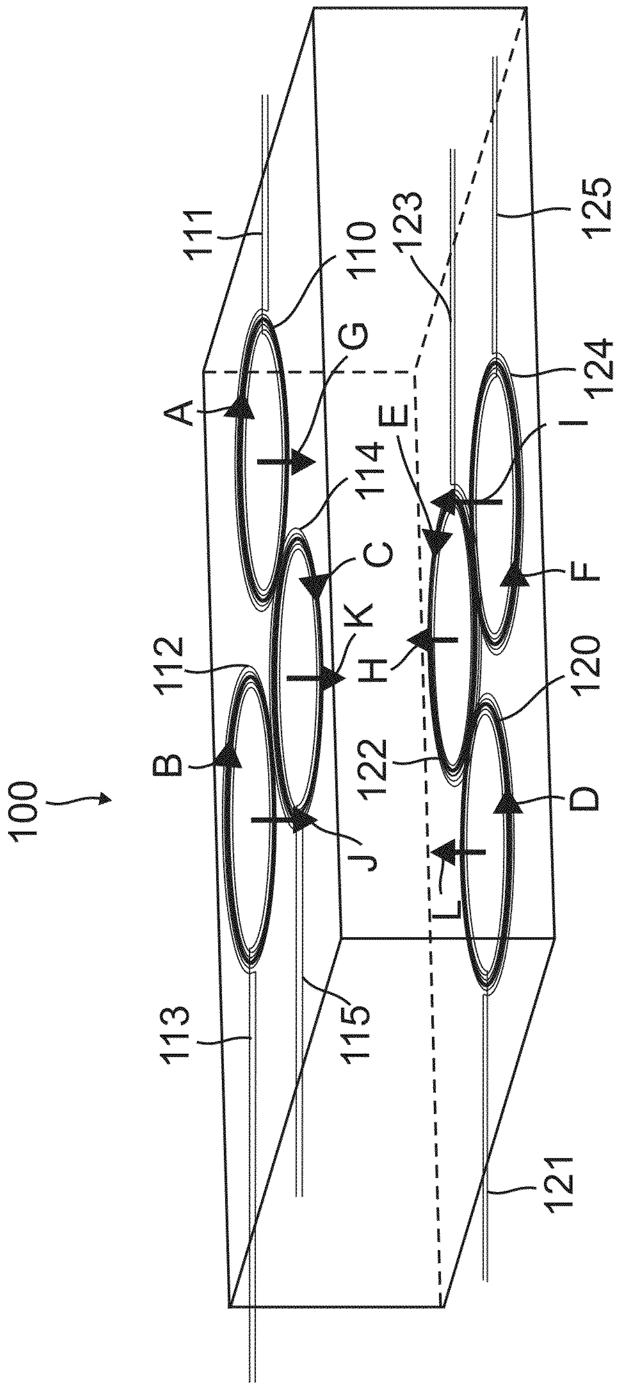
FIG. 4B is a perspective view of the magnetic field coil arrangement of FIG. 4A, which additionally shows the resulting magnetic field orientation for each of the coils.

FIG. 4B is a perspective view of the magnetic field coil arrangement 100 of FIG. 4A, which additionally shows the resulting magnetic field orientation for each of the coils with the respective current flows. The coils 110, 112, and 114 have magnetic fields oriented toward the bottom of magnetic field coil arrangement 100 as indicated respectively by arrows G, J, and K, with the current flowing in a clockwise direction around each of the coils. The coils 120, 122, and 124 have magnetic fields oriented toward the top of magnetic field coil arrangement 100 as indicated respectively by arrows L, H, and I.

The current flow configuration shown in FIGS. 4A and 4B for magnetic field coil arrangement 100 provides a good approximation of a quadrupole field near a central location of a MOT, providing for optimal cooling and trapping of the atoms in the MOT.

Figure 5:
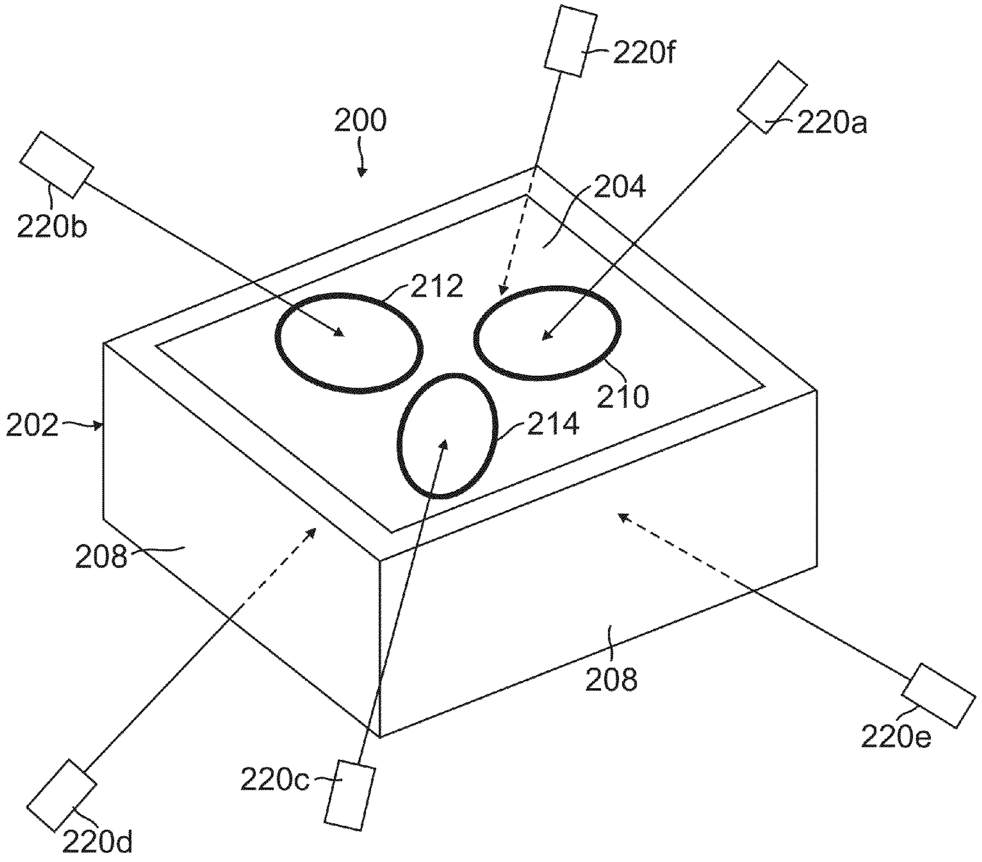
FIG. 5 is a schematic perspective view of a MOT device according to one embodiment.
Figure 6:
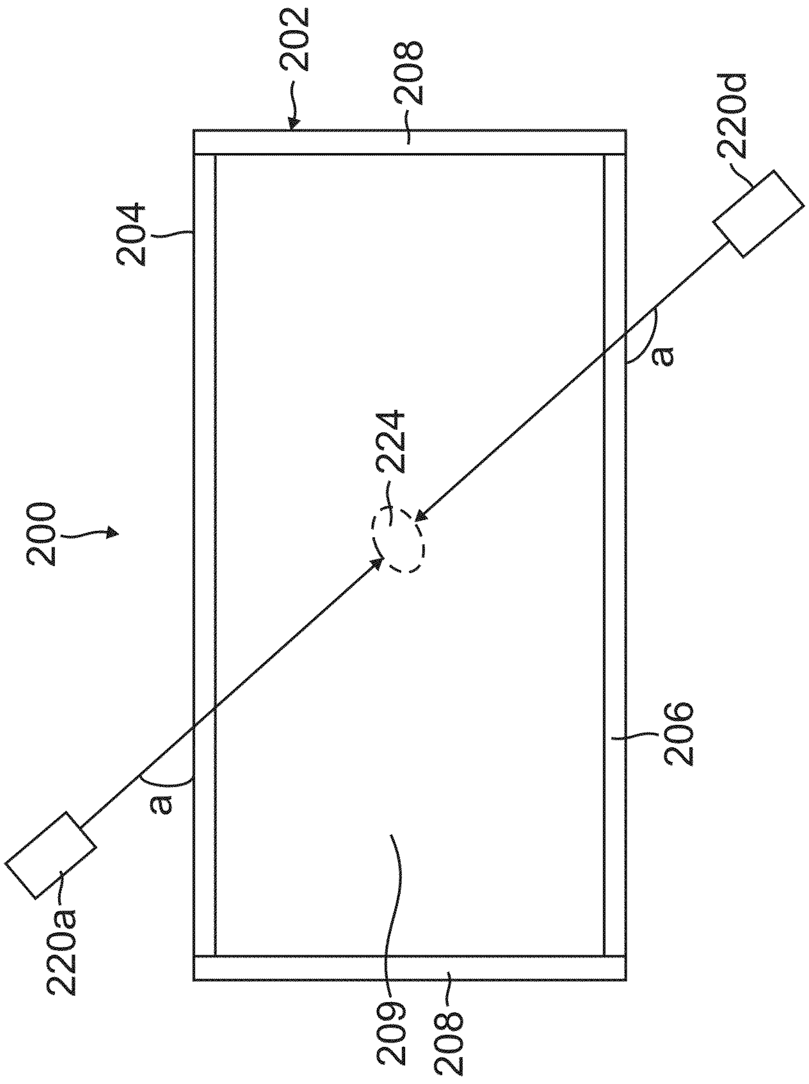
FIG. 6 is a simplified side view of the MOT device of FIG. 5.

FIGS. 5 and 6 illustrate a MOT device 200 according to one embodiment that can implement the magnetic field coil configuration described previously. The MOT device 200 generally comprises a vacuum cell 202 that includes a first transparent panel 204, an opposing second transparent panel 206, and a plurality of side walls 208 between transparent panels 204 and 206, which enclose a vacuum chamber 209 for atom cooling. As shown in FIG. 5, a first set of magnetic field coils is located on transparent panel 204, and includes a first coil 210, a second coil 212, and a third coil 214. A second set of magnetic field coils is located on transparent panel 206 in an offset alignment with the first set of magnetic field coils, such as described above with respect to FIG. 2. The magnetic field coils can be electrically connected to a plurality of current sources such as described above with respect to FIG. 3A.

A plurality of laser devices 220*a*, 220*b*, and 220*c* are configured to respectively direct collimated laser beams through first coil 210, second coil 212, and third coil 214 on transparent panel 204 into vacuum chamber 209, as shown in FIG. 5. Likewise, a plurality of laser devices 220*d*, 220*e*, and 220*f* are respectively configured to direct collimated laser beams through the magnetic field coils on transparent panel 206 into vacuum chamber 209 in the opposite direction from the laser beams emitted from laser devices 220*a*, 220*b*, and 220*c*. The laser beams that pass through the respective magnetic field coils on transparent panels 204 and 206 are angled such that the beams intersect in a central location 224 of vacuum chamber 209 along orthogonal axes.

For example, as depicted in FIG. 6, the laser beams can be propagated into vacuum chamber 209 at an angle (a) of about 45 degrees with respect to the surfaces of transparent panels 204 and 206. The laser device 220*a* directs a laser beam through the coil on transparent substrate 204 toward central location 224, and laser device 220*d* directs a laser beam in the opposite direction through the coil on transparent panel 206 toward central location 224, such that the laser beams intersect at central location 224. The other laser devices propagate laser beams in a similar manner such that the beams intersect orthogonally in central location 224 of vacuum chamber 209. This results in optimal cooling and trapping of atoms in vacuum chamber 209.

The vacuum cell 202 can be implemented as a vacuum package for a cold atom sensor in various embodiments. When vacuum cell 202 functions as part of a cold atom sensor, vacuum chamber 209 contains atoms that are cooled by the intersecting laser beams in central location 224. The trapped atoms can then be monitored as part of a precision atomic clock, a magnetometer, a gyroscope, an accelerometer, or the like.

Figure 7:
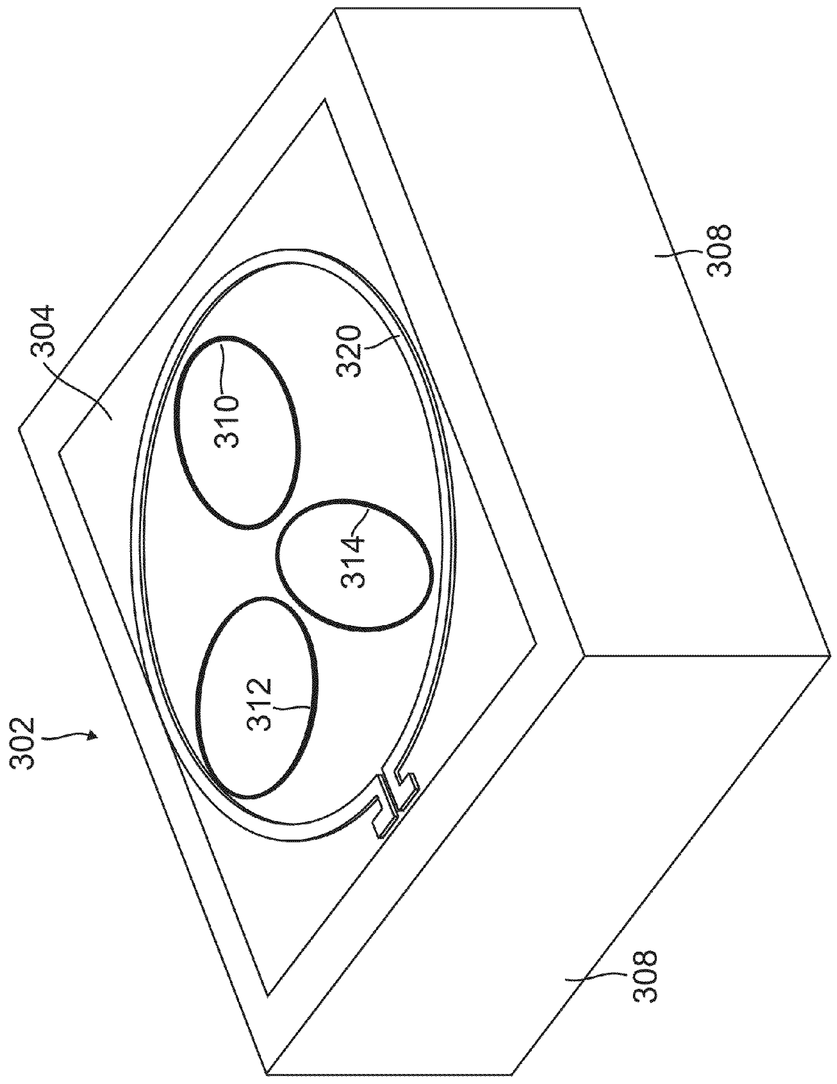
FIG. 7 illustrates a vacuum cell for a MOT device according to an alternative embodiment.

FIG. 7 illustrates a vacuum cell 302 for a MOT according to an alternative embodiment that can implement the magnetic field coil configuration described previously. The vacuum cell 302 includes a first transparent panel 304, an opposing second transparent panel, and a plurality of side walls 308 between the transparent panels, which enclose a vacuum chamber for atom cooling. A first set of magnetic field coils is located on transparent panel 304, and includes a first coil 310, a second coil 312, and a third coil 314. A second set of magnetic field coils is located on the opposing transparent panel in an offset alignment with the first set of magnetic field coils, such as described above with respect to FIG. 2. The magnetic field coils can be electrically connected to a plurality of current sources such as described above with respect to FIG. 3A.

An optional magnetic field coil 320 can be located on transparent panel 304, as shown in FIG. 7, which surrounds coils 310, 312, and 314. A similar magnetic field coil can be located on the opposing transparent panel, surrounding the second set of magnetic field coils. The magnetic coil 320 provides a bias magnetic field that enables optimization of the center of the magnetic field distribution with respect to the intersection of the laser beams.

In one embodiment, the magnetic field coils of vacuum cell 302 can be aligned with an internal folded optics configuration, such as disclosed in U.S. application Ser. No. 13/663,057, filed Oct. 29, 2012, entitled FOLDED OPTICS FOR BATCH FABRICATED ATOMIC SENSOR, the disclosure of which is incorporated herein by reference, in order to produce a fully planar batch fabricated MOT. By adding the present magnetic field coil arrangement to a MOT with folded optics, the quadrupole field produced is optimized relative to the intersecting laser beams, providing optimal cooling and trapping of the atoms.

Figure 8:
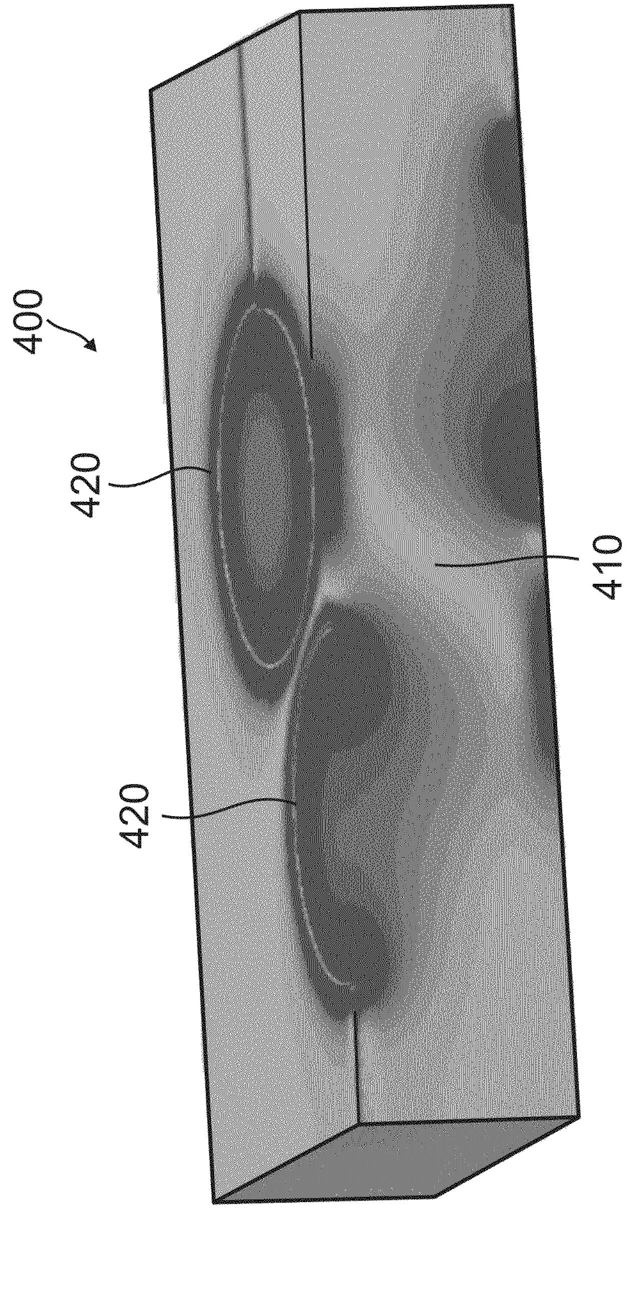
FIGS. 8 and 9 are three-dimensional magnetic field models representing cross sections of a vacuum cell for a MOT device.

FIG. 8 is a three-dimensional (3-D) magnetic field model 400 representing a cross section of a vacuum cell for a MOT with the magnetic field coil arrangement described herein. The cross section is parallel to a side wall of the vacuum cell. The magnetic field is at a minimum (close to zero) in a central area of the vacuum cell, indicated at 410, with a strong field gradient extending outward toward the area of the coils, indicated at 420, along the directions that the laser beams propagate.

Figure 9:
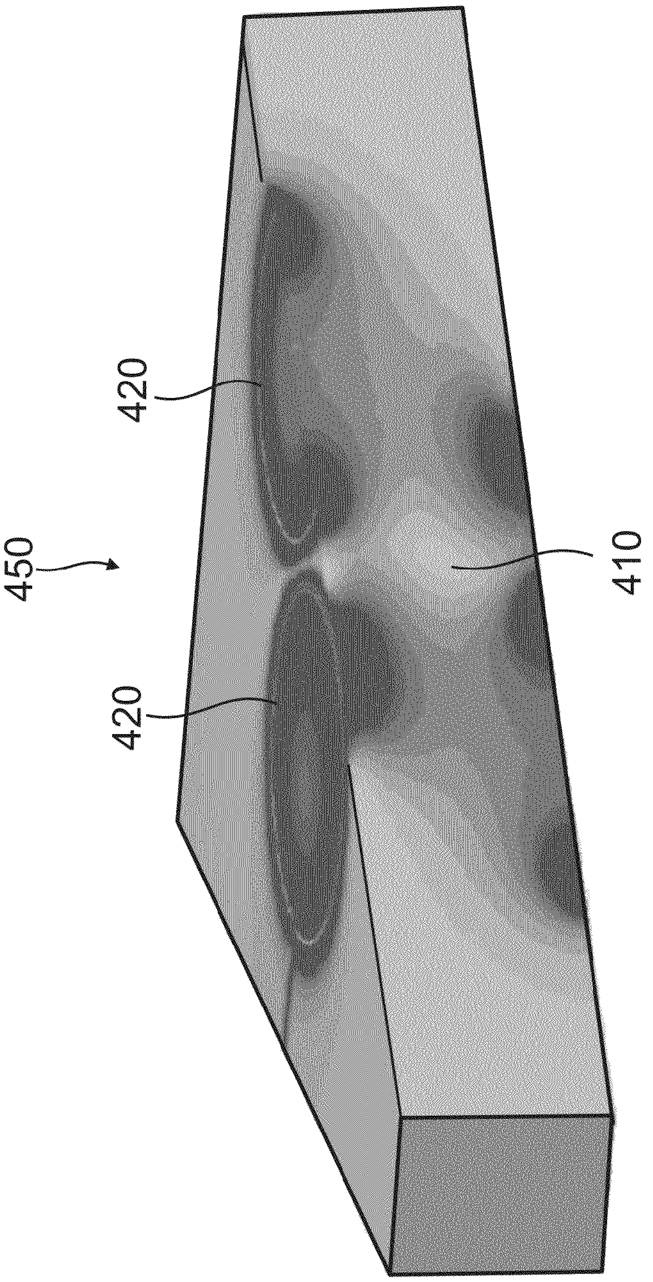

FIG. 9 is a 3-D magnetic field model 450 representing an off axis cross section of a vacuum cell for a MOT with the magnetic field coil arrangement described herein. Again, the magnetic field is at a minimum (close to zero) in the central area of the vacuum cell, indicated at 410, with a strong field gradient extending outward toward the coils, indicated at 420, along the directions that the laser beams propagate.

Figure 10A:
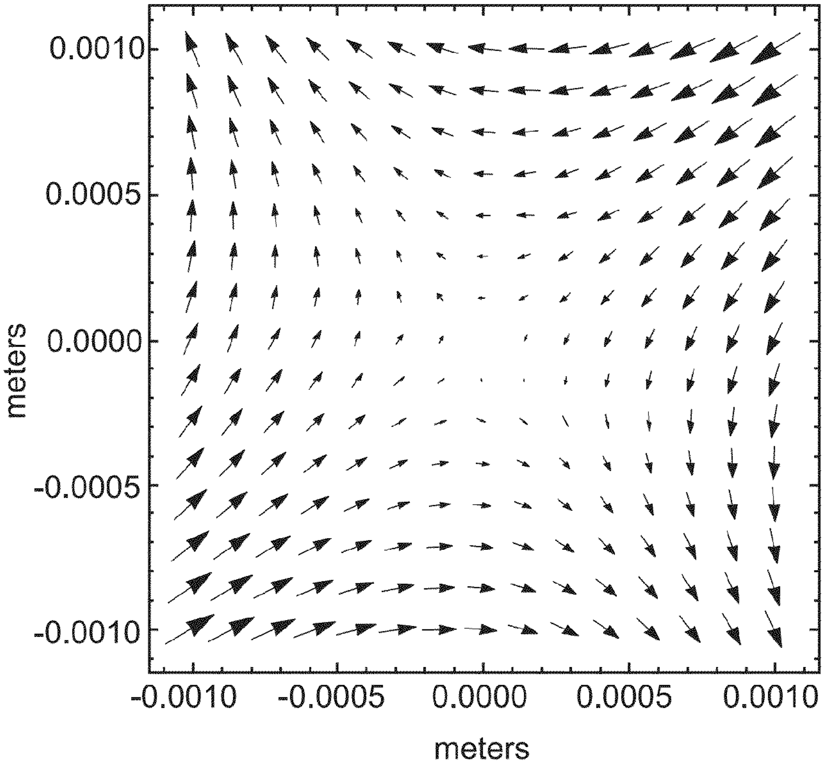
FIGS. 10A, 11A, and 12A are magnetic field vector plots representing the components of the total magnetic field in a sensor body for a MOT device.
Figure 10B:
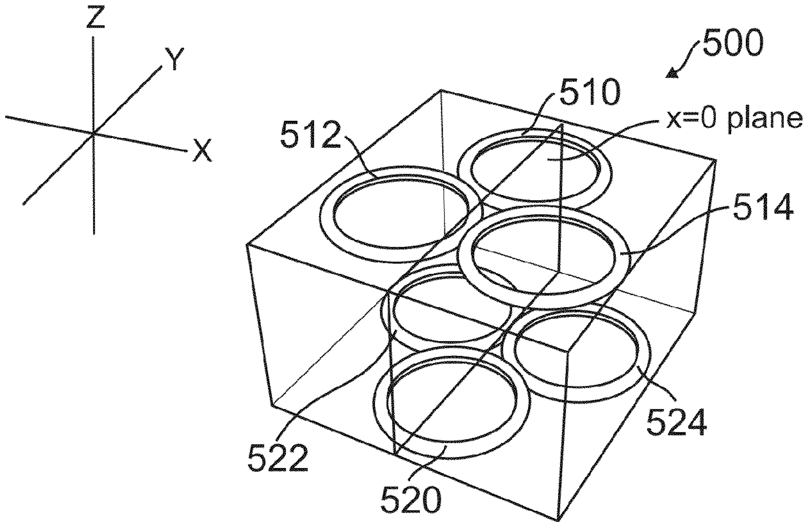
FIGS. 10B, 11B, and 12B depict the planes in the sensor body in which the magnetic field vectors are plotted in FIGS. 10A, 11A, and 12A.
Figure 11A:
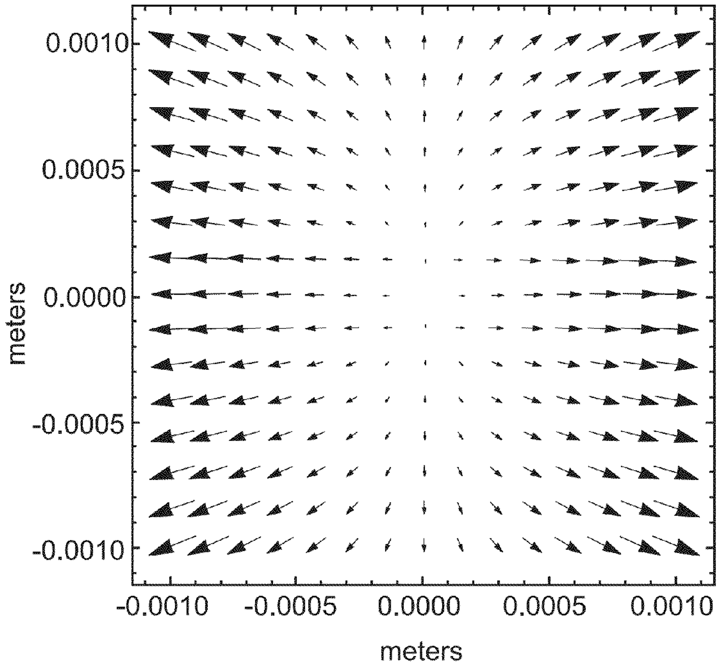
Figure 11B:
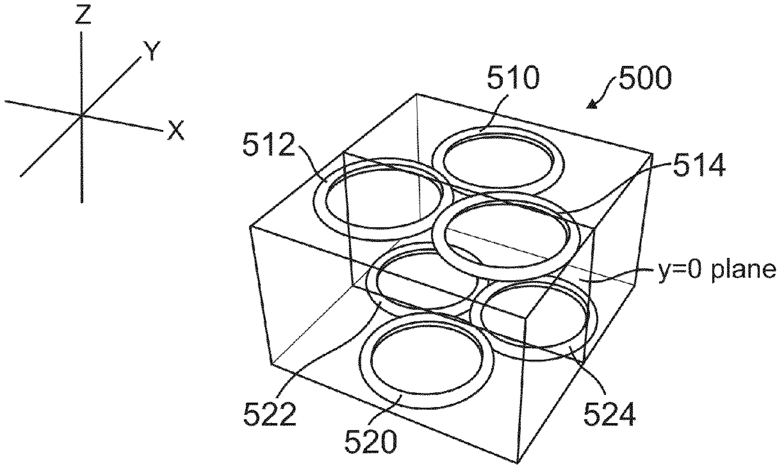
Figure 12A:
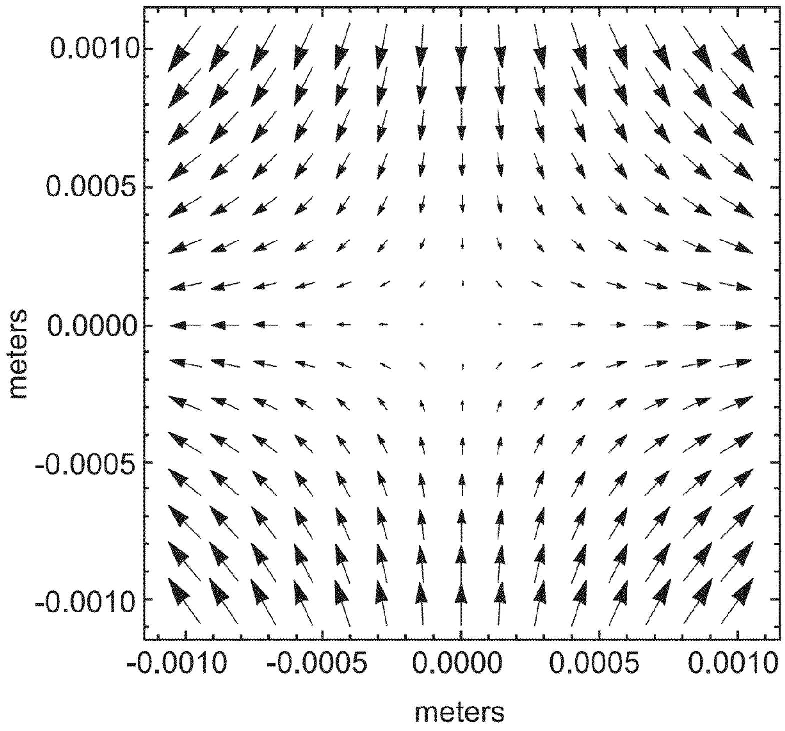
Figure 12B:
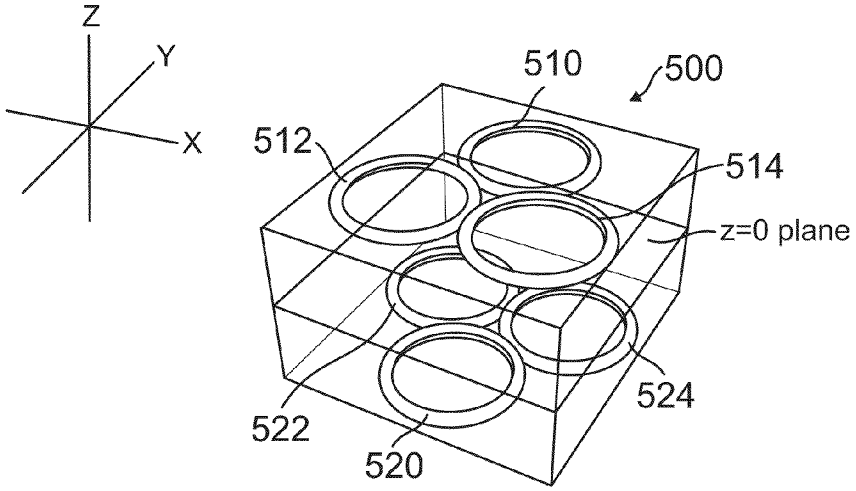

FIG. 10A is a magnetic field vector plot representing the {By,Bz} components of the total magnetic flux density (B) field in an x=0 plane of a sensor body 500, such as a vacuum cell of a MOT, as shown in FIG. 10B. The sensor body 500 includes a magnetic field coil arrangement of six coils, with three coils 510, 512, 514 on an upper transparent surface, and three coils 520, 522, 524 on a lower transparent surface. FIG. 11A is a magnetic field vector plot representing the {Bx,Bz} components of the total B field in the y=0 plane of sensor body 500, which is depicted in FIG. 11B. FIG. 12A is a magnetic field vector plot representing the {Bx,By} components of the total B field in the z=0 plane of sensor body 500, which is depicted in FIG. 12B. The origin point in the center of each of the plots of FIGS. 10A, 11A, and 12A represents the central location inside of sensor body 500 where each of the planes intersect. As depicted in the plots, the components of the magnetic field get smaller toward the center such that the center has a zero field.

Example Embodiments

Example 1 includes a magnetic field coil arrangement for a magneto-optical trap, comprising: a first transparent substrate having a first surface; a second transparent substrate having a second surface opposite from the first surface; one or more side walls coupled between the first and second transparent substrates; a first set of magnetic field coils on the first surface of the first transparent substrate; and a second set of magnetic field coils on the second surface of the second transparent substrate, the second set of magnetic field coils in an offset alignment with the first set of magnetic field coils; wherein the first and second sets of magnetic field coils are configured to produce a magnetic field distribution that mimics a quadrupole magnetic field distribution in a central location between the first and second transparent substrates.

Example 2 includes the magnetic field coil arrangement of Example 1, wherein the first and second transparent substrates each comprise a glass panel.

Example 3 includes the magnetic field coil arrangement of any of Examples 1-2, wherein the first set of magnetic field coils are electrically connected to one or more power sources, and the second set of magnetic field coils are electrically connected to one or more power sources.

Example 4 includes the magnetic field coil arrangement of any of Examples 1-3, wherein the first set of magnetic field coils includes a first coil, a second coil, and a third coil, in a substantially planar configuration and spaced apart from each other around a central location on the first surface of the first transparent substrate.

Example 5 includes the magnetic field coil arrangement of Example 4, wherein the second set of magnetic field coils includes a fourth coil, a fifth coil, and a sixth coil, in a substantially planar configuration and spaced apart from each other around a central location on the second surface of the second transparent substrate.

Example 6 includes the magnetic field coil arrangement of any of Examples 4 and 5, wherein: the first coil is connected to a first current source such that a current flows in a counter clockwise direction around the first coil; the second coil is connected to a second current source such that a current flows in a clockwise direction around the second coil; and the third coil is connected to a third current source such that a current flows in a clockwise direction around the third coil.

Example 7 includes the magnetic field coil arrangement of any of Examples 5 and 6, wherein: the fourth coil is connected to a fourth current source such that a current flows in a clockwise direction around the fourth coil; the fifth coil is connected to a fifth current source such that a current flows in a counter clockwise direction around the fifth coil; and the sixth coil is connected to a sixth current source such that a current flows in a counter clockwise direction around the sixth coil.

Example 8 includes the magnetic field coil arrangement of any of Examples 4 and 5, wherein: the first coil is connected to a first current source such that a current flows in a clockwise direction around the first coil; the second coil is connected to a second current source such that a current flows in a clockwise direction around the second coil; and the third coil is connected to a third current source such that a current flows in a clockwise direction around the third coil.

Example 9 includes the magnetic field coil arrangement of any of Examples 5 and 8, wherein: the fourth coil is connected to a fourth current source such that a current flows in a counter clockwise direction around the fourth coil; the fifth coil is connected to a fifth current source such that a current flows in a counter clockwise direction around the fifth coil; and the sixth coil is connected to a sixth current source such that a current flows in a counter clockwise direction around the sixth coil.

Example 10 includes a magneto-optical trap device, comprising: a vacuum cell comprising a first transparent panel having a first surface; a first set of magnetic field coils on the first surface of the first transparent panel; a second transparent panel having a second surface opposite from the first surface; a second set of magnetic field coils on the second surface of the second transparent panel, the second set of magnetic field coils in an offset alignment with the first set of magnetic field coils; one or more side walls coupled between the first and second transparent panels; and a vacuum chamber enclosed by the first and second transparent panels, and the one or more sidewalls. The magneto-optical trap device further comprises a plurality of power sources electrically connected to the first and second sets of magnetic field coils; and a plurality of laser devices each configured to direct a laser beam through a respective magnetic field coil in the first and second sets of magnetic field coils such that the laser beams intersect along orthogonal axes in a central location of the vacuum chamber. The first and second sets of magnetic field coils produce a magnetic field distribution that mimics a quadrupole magnetic field distribution in the central location of the vacuum chamber.

Example 11 includes the magneto-optical trap device of Example 10, wherein the first and second transparent panels each comprise a glass panel.

Example 12 includes the magneto-optical trap device of any of Examples 10-11, wherein the first set of magnetic field coils includes a first coil, a second coil, and a third coil, in a substantially planar configuration and spaced apart from each other around a central location on the first surface of the first transparent panel.

Example 13 includes the magneto-optical trap device of Example 12, wherein the second set of magnetic field coils includes a fourth coil, a fifth coil, and a sixth coil, in a substantially planar configuration and spaced apart from each other around a central location on the second surface of the second transparent panel.

Example 14 includes the magneto-optical trap device of any of Examples 12-13, wherein: the first coil is connected to a first current source such that a current flows in a counter clockwise direction around the first coil; the second coil is connected to a second current source such that a current flows in a clockwise direction around the second coil; and the third coil is connected to a third current source such that a current flows in a clockwise direction around the third coil.

Example 15 includes the magneto-optical trap device of any of Examples 13-14, wherein: the fourth coil is connected to a fourth current source such that a current flows in a clockwise direction around the fourth coil; the fifth coil is connected to a fifth current source such that a current flows in a counter clockwise direction around the fifth coil; and the sixth coil is connected to a sixth current source such that a current flows in a counter clockwise direction around the sixth coil.

Example 16 includes the magneto-optical trap device of any of Examples 10-15, wherein the vacuum cell further comprises an additional magnetic field coil on the first surface that substantially surrounds the first set of magnetic field coils.

Example 17 includes the magneto-optical trap device of Example 16, wherein the vacuum cell further comprises an additional magnetic field coil on the second surface that substantially surrounds the second set of magnetic field coils.

Example 18 includes a method of fabricating a vacuum cell for a magneto-optical trap, the method comprising: forming a first set of magnetic field coils on a first surface of a first transparent substrate; forming a second set of magnetic field coils on a second surface of a second transparent substrate; attaching the first and second substrates to one or more side walls such that the first surface is opposite from the second surface, and the second set of magnetic field coils is in an offset alignment with the first set of magnetic field coils; and forming a vacuum chamber enclosed by the first and second transparent substrates, and the one or more sidewalls, wherein the first and second sets of magnetic field coils produce a magnetic field distribution that mimics a quadrupole magnetic field distribution in a central location of the vacuum chamber.

Example 19 includes the method of Example 18, wherein the first set of magnetic field coils includes a first coil, a second coil, and a third coil, which are formed in a substantially planar configuration and spaced apart from each other around a central location on the first surface of the first transparent substrate.

Example 20 includes the method of Example 19, wherein the second set of magnetic field coils includes a fourth coil, a fifth coil, and a sixth coil, which are formed in a substantially planar configuration and spaced apart from each other around a central location on the second surface of the second transparent substrate.

The present invention may be embodied in other forms without departing from its essential characteristics. The described embodiments are to be considered in all respects only as illustrative and not restrictive. Therefore, it is intended that this invention be limited only by the claims and the equivalents thereof.

What is claimed is:

1. A magnetic field coil arrangement for a magneto-optical trap, comprising:

a first transparent substrate having a first surface;

a second transparent substrate having a second surface opposite from the first surface;

one or more side walls coupled between the first and second transparent substrates;

a first set of magnetic field coils on the first surface of the first transparent substrate; and a second set of magnetic field coils on the second surface of the second transparent substrate, the second set of magnetic field coils in an offset alignment with the first set of magnetic field coils;

wherein the first and second sets of magnetic field coils are configured to produce a magnetic field distribution that mimics a quadrupole magnetic field distribution in a central location between the first and second transparent substrates.

2. The magnetic field coil arrangement of claim 1, wherein the first and second transparent substrates each comprise a glass panel.

3. The magnetic field coil arrangement of claim 1, wherein the first set of magnetic field coils are electrically connected to one or more power sources, and the second set of magnetic field coils are electrically connected to one or more power sources.

4. The magnetic field coil arrangement of claim 1, wherein the first set of magnetic field coils includes a first coil, a second coil, and a third coil, in a substantially planar configuration and spaced apart from each other around a central location on the first surface of the first transparent substrate.

5. The magnetic field coil arrangement of claim 4, wherein the second set of magnetic field coils includes a fourth coil, a fifth coil, and a sixth coil, in a substantially planar configuration and spaced apart from each other around a central location on the second surface of the second transparent substrate.

6. The magnetic field coil arrangement of claim 5, wherein:

the first coil is connected to a first current source such that a current flows in a counter clockwise direction around the first coil;

the second coil is connected to a second current source such that a current flows in a clockwise direction around the second coil; and the third coil is connected to a third current source such that a current flows in a clockwise direction around the third coil.

7. The magnetic field coil arrangement of claim 6, wherein:

the fourth coil is connected to a fourth current source such that a current flows in a clockwise direction around the fourth coil;

the fifth coil is connected to a fifth current source such that a current flows in a counter clockwise direction around the fifth coil; and the sixth coil is connected to a sixth current source such that a current flows in a counter clockwise direction around the sixth coil.

8. The magnetic field coil arrangement of claim 5, wherein:

the first coil is connected to a first current source such that a current flows in a clockwise direction around the first coil;

the second coil is connected to a second current source such that a current flows in a clockwise direction around the second coil; and the third coil is connected to a third current source such that a current flows in a clockwise direction around the third coil.

9. The magnetic field coil arrangement of claim 8, wherein:

the fourth coil is connected to a fourth current source such that a current flows in a counter clockwise direction around the fourth coil;

the fifth coil is connected to a fifth current source such that a current flows in a counter clockwise direction around the fifth coil; and the sixth coil is connected to a sixth current source such that a current flows in a counter clockwise direction around the sixth coil.

10. A magneto-optical trap device, comprising:

a vacuum cell comprising:

a first transparent panel having a first surface;

a first set of magnetic field coils on the first surface of the first transparent panel;

a second transparent panel having a second surface opposite from the first surface;

a second set of magnetic field coils on the second surface of the second transparent panel, the second set of magnetic field coils in an offset alignment with the first set of magnetic field coils;

one or more side walls coupled between the first and second transparent panels; and a vacuum chamber enclosed by the first and second transparent panels, and the one or more sidewalls;

a plurality of power sources electrically connected to the first and second sets of magnetic field coils; and a plurality of laser devices each configured to direct a laser beam through a respective magnetic field coil in the first and second sets of magnetic field coils such that the laser beams intersect along orthogonal axes in a central location of the vacuum chamber;

wherein the first and second sets of magnetic field coils produce a magnetic field distribution that mimics a quadrupole magnetic field distribution in the central location of the vacuum chamber.

11. The magneto-optical trap device of claim 10, wherein the first and second transparent panels each comprise a glass panel.

12. The magneto-optical trap device of claim 10, wherein the first set of magnetic field coils includes a first coil, a second coil, and a third coil, in a substantially planar configuration and spaced apart from each other around a central location on the first surface of the first transparent panel.

13. The magneto-optical trap device of claim 12, wherein the second set of magnetic field coils includes a fourth coil, a fifth coil, and a sixth coil, in a substantially planar configuration and spaced apart from each other around a central location on the second surface of the second transparent panel.

14. The magneto-optical trap device of claim 13, wherein:

the first coil is connected to a first current source such that a current flows in a counter clockwise direction around the first coil;

the second coil is connected to a second current source such that a current flows in a clockwise direction around the second coil; and the third coil is connected to a third current source such that a current flows in a clockwise direction around the third coil.

15. The magneto-optical trap device of claim 14, wherein:

the fourth coil is connected to a fourth current source such that a current flows in a clockwise direction around the fourth coil;

the fifth coil is connected to a fifth current source such that a current flows in a counter clockwise direction around the fifth coil; and the sixth coil is connected to a sixth current source such that a current flows in a counter clockwise direction around the sixth coil.

16. The magneto-optical trap device of claim 10, wherein the vacuum cell further comprises an additional magnetic field coil on the first surface that substantially surrounds the first set of magnetic field coils.

17. The magneto-optical trap device of claim 16, wherein the vacuum cell further comprises an additional magnetic field coil on the second surface that substantially surrounds the second set of magnetic field coils.

18. A method of fabricating a vacuum cell for a magneto-optical trap, the method comprising:

forming a first set of magnetic field coils on a first surface of a first transparent substrate;

forming a second set of magnetic field coils on a second surface of a second transparent substrate;

attaching the first and second substrates to one or more side walls such that the first surface is opposite from the second surface, and the second set of magnetic field coils is in an offset alignment with the first set of magnetic field coils; and forming a vacuum chamber enclosed by the first and second transparent substrates, and the one or more sidewalls, wherein the first and second sets of magnetic field coils produce a magnetic field distribution that mimics a quadrupole magnetic field distribution in a central location of the vacuum chamber.

19. The method of claim 18, wherein the first set of magnetic field coils includes a first coil, a second coil, and a third coil, which are formed in a substantially planar configuration and spaced apart from each other around a central location on the first surface of the first transparent substrate.

20. The method of claim 19, wherein the second set of magnetic field coils includes a fourth coil, a fifth coil, and a sixth coil, which are formed in a substantially planar configuration and spaced apart from each other around a central location on the second surface of the second transparent substrate.

* * * * *